United States Patent

Bauer

[11] 3,886,797
[45] June 3, 1975

[54] DEVICE FOR MEASURING THE HUMIDITY OF GASES

[76] Inventor: Hans Bauer, Fuchsweg 2, 782 Titisee-Neustadt, Germany

[22] Filed: Oct. 18, 1973

[21] Appl. No.: 407,462

[52] U.S. Cl. .................. 73/335; 73/336.5; 73/338; 73/29
[51] Int. Cl. .......................................... G01n 25/64
[58] Field of Search ....... 73/335, 336.5, 338, 338.3, 73/29, 77, 342, 1 F

[56] References Cited
UNITED STATES PATENTS

| | | | |
|---|---|---|---|
| 1,765,842 | 6/1930 | Loepsinger | 73/335 |
| 1,855,774 | 4/1932 | Schneider | 73/336.5 |
| 2,349,860 | 5/1944 | Hainer | 73/336.5 |
| 2,732,710 | 1/1956 | Richardson | 73/338.3 |
| 2,915,898 | 12/1959 | VanLuik | 73/29 |
| 3,326,044 | 6/1967 | Ward | 73/336.5 |
| 3,347,098 | 10/1967 | Bielstein et al. | 73/342 |
| 3,522,732 | 8/1970 | Bauer | 73/336.5 |
| 3,671,953 | 6/1972 | Goldberg | 73/342 |

Primary Examiner—Richard C. Queisser
Assistant Examiner—John S. Appleman

[57] ABSTRACT

Device for measuring the humidity of gases, comprising a probe, preferably in a portable casing, including two closed chambers which respectively lodge temperature-sensitive electric resistors, preferably having negative temperature coefficients, at least one chamber being made at least in part of a gas-permeable filter material, a supply tank for an evaporating liquid which is uniformly supplied to a porous evaporator body in one chamber, an electrical circuit for passing a noticeable current through at least one of the resistors so as to increase its temperature, electric differentiating means for comparing the resistance values of the resistors, and indicator means for reading therefrom humidity values of a gas in the neighborhood of the probe, in proportion to the established resistance values. The evaporator body is preferably of a ceramic material; one of the chambers has an envelope preferably made of a high-grade steel filter material; and a mounting within said chamber, for carrying the evaporator body, is preferably made of tetrafluoroethylene.

28 Claims, 7 Drawing Figures

DEVICE FOR MEASURING THE HUMIDITY OF GASES

The application relates to measuring devices, and particularly to a device for measuring the humidity of gases, including air. Such devices are generally designated hygrometers.

A particularly precise king of hygrometer is called a psychrometer. Such devices usually contain a dry and a wetted thermometer. When air or a gas affects the two thermometers, the dry thermometer shows air temperature while the wet thermometer registers the critical cooling temperature on account of evaporation. By way of known correlations the relative humidity of the air or of the gas being measured can easily be determined from the critical cooling temperature and the ambient or room air temperature.

In order not to falisify the measuring values, it has to be prevented that the wetted thermometer is subject to a greater heat removal or input. In the case of psychrometers with continual wetting usually some heat is brought to the wet thermometers through the wetting mechanisms so that temperature measurements at these thermometers are falsified.

Similarly, this temperature is usually indicated too high when heat is radiated onto the wet thermometer, namely from outside or for example by the observer. In order to minimize the unavoidable component of disturbing heat supply, evaporation with the so-called Assmann Psychrometer is accelerated, as a matter of example, in that the air is set into movement by means of an electrical or spring-driven ventilator at a reproducible speed of about 2 to 3 meters per second. This process has various disadvantages:

A. It is relatively difficult to produce and to maintain a uniform air current having a constant and precisely defined flow velocity.

B. The evaporator surface becomes dirty in a relatively short time of account of the moving air stream. This falsifier the measuring results. Frequent cleaning and continual maintenance of the device are consequently unavoidable.

C. In order to carry out the known processes, no measuring probes of small dimensions can be used for hand-held devices because it would be very uneconomical to realize the required air stream in a small handy measuring probe.

D. The measuring results are yet falsified by unavoidable heat radiation, despite the strong air stream.

E. Heat conductivity of air and of various other substances is, among others also a function of humidity. This means that the variable heat conductance factor between the evaporator surface on the wet thermometer and the thermometer itself, for example a thermoelement or a temperature-sensitive resistor, enter into the measuring results as an error.

F. With the known psychrometric devices the humidity content of granular or pulverulent materials (for example flour, grain, plastic granulates and the like) cannot be determined because these materials would be promptly set into turbulence when a probe is introduced that contains the two thermometers, which would evidently block the measuring points.

It is known furthermore to incorporate the thermometers, such as thermoelements or temperature-sensitive electrical resistors, into differential circuits, such as bridge circuits and the like, whereupon conclusions can be made from the resistance differences in respect of the humidity of the air or the gas being measured.

It is an object of the present invention to provide a handy and convenient device for humidity measurements of gases, in which the air is set into motion, and where nevertheless measuring results are obtained that ae practically free from errors.

The so-called psychrometric difference, which constitutes a measure for air humidity, which sets in at room temperature as a difference between the dry and the wet thermoelement, is too small; and besides, its increase by air movements should be avoided, as explained before. Consequently a new approach had to be found.

The object has been solved, in accordance with major features of the present invention, by a device for measuring the humidity of gases which has a pair of temperature-sensitive electric resistors, at least one of the two resistors being traversed by a noticeable current so as to increase its temperature, the two resistors being disposed in respective closed chambers of which one is at least partly constituted by a gas-permeable filter materials. Means are provided for the uniform supply of an evaporating liquid from a supply tank to an evaporator body made of a porous material which preferably surrounds the resistor which is in the chamber of gas-permeable filter material, with a differential circuit connected to a voltage source, and an indicator device connected to the differential circuit to show the humidity of the gas in the immediate neighborhood of the inventive device, which is proportional to the difference of the resistance values.

In the known processes evaporation was accelerated, without simultaneous heat supply or removal, and the temperature difference between the two thermal elements or resistors was increased, by setting the air into movement. In contradistinction, evaporation is favored and promoted in the invention according to this application by heating up the temperature-sensitive resistor at the wet position. Referring again to the known processes, heating of the measuring resistors by current flow led to a falsification of the measuring results so that current flow had to be kept possibly low. On the contrary, the invention intentionally makes a noticeable current to pass at least through the resistor at the wet location.

Am important feature and characteristic of the invention consists in that the two resistors are placed in their respective closed chambers, wherein the "dry" resistor, referred to as the second resistor, is hermetically closed in respect of the ambient atmosphere, while the "wet" resistor, identified as the first resistor, contacts the surroundings by the intermediary of a gas-permeable filter material. Such a filter material, which may consist for example of a double high-grade filter material with a permeability cross-section of a few micrometers, has the task of allowing the gas under measurement to reach the resistor but simultaneously to reduce the own movement of the gas to the extent practically no air or gas convection occurs inside the measuring chamber, only a diffusional movement. The measurements according to the invention are possible solely under these conditions.

The resistors used in the inventive device are preferably in the form of semiconductor beads having negative temperature coefficients. The intensity of the current fed to the first resistor is measured so that the evaporation, on account of the heating-up of the resistor by this current, corresponds approximately to the humidity attained by maintaining an air stream with a streaming velocity of for example 2 meters per second. The resistance value of the resistor is lowered by this current, if a negative-coefficient resistor is used, while it is increased by evaporation and/or the concomitant cooling that results from evaporation.

However the heat conductivity of the air surrounding the resistor, which is also dependent on air humidity, influences the value of the resistor. Consequently a stationary or constant temperature sets in, depending on the temperature of the resistor, the evaporation factor on the heated-up wetted point, and the heat conductivity of the surrounding air, which temperature is then compared with the air or gas temperature measured at the second, not wetted resistor.

As a result, a rather precise measurement is accomplished which is hardly subject to the disturbing effects explained above. In the known measuring devices, the self-heating of the heat-sensitive resistor by convection and conduction became part of the measurement which was falsified thereby; in the inventive device such measuring errors are picked up and eliminated.

It is most important that the first resistor is not influenced as to temperature by heat conduction or radiation. To this end, this resistor is held by its leads out of contact with solid parts of the arrangement.

By use of the features according to the invention it became possible to design the measuring device in the form of an easily transportable instrument which has an easy-to-use probe. The latter includes in lengthwise alignment the two chambers, the supply tank and a handle. The electrical circuit including differentiating means as well as an indicator or meter are disposed in a portable casing which is connected with the inside of probe by a cable so as to provide connection to the two resistors, the scale of the instrument being visible from outside.

In order uniformly to wet the gas which surrounds the first resistor, a preferred feature of the invention provides a beaker-shaped extension or enlargement of the evaporator body disposed at the forward end of the probe, the first resistor being attached near the inner bottom surface of the body. The latter is preferably made of a ceramic material.

It is most important according to the invention that the liquid be uniformly supplied in all positions of the probe. The first expedient for insuring uniform wetting consists in that the bottom of the beaker-shaped evaporator body is thicker than its walls, and that this bottom is liquid-tightly secured in a thin-walled, tubluar mounting which is made of a poor heat conductor. The mounting protrudes beyond the outer bottom surface of the body, narrows rearwardly to form a restriction which constitutes a heat localization spot, and continues as a single piece in the form of an inlet conduit; the latter carries therein a wick in contact with the outer surface of the evaporator body for supplying the evaporating liquid.

The mounting preferably consists of a plastic, such as for example tetrafluoroethylene, and prevents heat supply or removal to or from the evaporator body. The reduction in cross-section of the mounting constitutes the heat localization spot. At the same time, a liquid-tight seating between the body and its mounting is insured so that liquid is supplied to the evaporator exclusively by the capillarity of the evaporator body and not by an extraneous liquid film. The surface of the body which effects evaporation can also be dimensioned with ample tolerance so that transient changes in the supplied liquid quantity have no effect on the measuring accuracy.

The mounting of the evaporator body should preferably terminate below the inner bottom surface thereof so that a pre-evaporation path is formed before the evaporating maximum, at about the height of the first resisto r. which path allows the remaining temperature fluctuations to be compensated for, which are a result of the evaporating-liquid supply.

Above the point of the evaporating maximum the body is extended so that an evaporating minimum results. The difference between maximum and minimum positively influences further liquid transport as a result of capillarity because the resulting drop in concentration of the liquid has an equalizing effect on evaporation.

The mounting for the evaporator body preferably defines an inner space into which the earlier-mentioned wick extends with a substantial part thereof so as to fill the space with the evaporating liquid.

According to further important features of the invention, the rear end of the wick contacts a cannula which is shaped as, or continues in the form of, a cooling coil or loop for purposes of temperature adaptation between the evaporating liquid, passing through the cannula, and the ambient temperature.

The liquid is further transported in this cannula by capillarity, and the liquid is adapted to room temperature, thereby further improving measuring accuracy. Such temperature adaptation or compensation can occur, for example, within the rear chamber in which the so-called dry comparison resistor is lodged.

The rear end of the cannula can be made to contact the front end of an absorbent rod, the rear end of the latter being dipped into or reaching to the supply tank for the evaporating liquid.

The tank is preferably shaped as an elongated, transparent tube, the absorbent rod running inside the tube along the major part of its extension, protruding at the front end for connection with the cannula, the protruding portion of the rod constituting an impediment or transport stop for the evaporating liquid.

This protruding portion is preferably held in the bore of a stopper that closes the supply tank so that the portion protruding from the liquid allows liquid transport merely by way of the capillary effect, in all positions of the probe. Particularly when the latter is held downwardly with its tip, is this impediment advantageous for maintaining uniform liquid supply to the evaporator body.

Yet another useful feature of the inventive device consists in the provision of a collecting receptacle at the rear end of the supply tank, into which receptacle the rear end of a pressure-compensating capillary and the front end of an aerating tube extend, the former passing through the rear wall of the tank and ending near the front end thereof, while the latter passes through the wall of the receptacle and terminates outside at a point where exiting liquid does not cause any disturbance.

The supply tank is designed so that it can be sealed in a manner capable of maintaining subatmospheric pressure therein, so that the same can be filled quickly and easily, and a vacuum can be formed in its sealed inner space.

When the probe is held horizontally or with its tip pointing in the downward direction, temporarily liquid-supply control is performed by the explained transport stop or impediment until a vacuum is formed inside the supply tank. This vacuum checks further liquid supply in the direction toward the evaporator body. When vacuum has reached a value that neutralizes the hydrostatic pressure and the weight of the evaporating liquid, the pressure-compensating capillary then takes effect.

At the point when atmospheric pressure in the receptacle exceeds the pressure at the frontal end of the supply tank, air can enter through the capillary to reduce the vacuum in the upper part of the tank, which is now the rearward one. This allows further supply of the evaporating liquid from the supply tank.

In order that the liquid discharged through the capillary can exit, in the event of reversed pressure conditions, at a point which does not cause any disturbance, the aerating tube is provided which conveys the liquid possibly contained in the receptacle to an appropriate spot. At the same time the aerating tube insures atmospheric pressure being maintained in the receptacle.

It will be understood by those skilled in the art that all liquid-conducting parts of the probe are dimensioned and designed as to their volume and supply capacity in observance of the evaporating capacity of the evaporator body.

The two resistor-containing chambers are preferably made with a common partition to which the connecting leads of the resistors can be secured. This provides in a simple manner heat compensation between the two chambers and particularly between the leads. The partition preferably consists of a poor heat conductor, such as a plastic material.

Between the second chamber, containing the so-called dry resistor, and the supply tank, the probe may be made with a considerable restriction which constitutes a heat localization spot, in a manner similar to the mounting of the evaporator body. This expedient further limits possible heat conduction along the probe.

At the front end of the first chamber which contains the so-called wet resistor, the invention provides a cap which carries an inner support of tubular shape and protruding toward the evaporator body; an absorber wick is inserted in the support, the rear end of the wick loosely contacting or resting on the open front end of the body. This wick acts as a dirt absorber which takes up possible contamination of a liquid film possibly formed on the surface of the evaporator body.

To favor the spreading of the wick at the rear end and in order not to affect the connecting leads of the first resistor, the tubular inner support can be made with a bell-shaped enlargement near or at the front end of the evaporator body.

Furthermore, it is also a feature of the invention that the cap for closing the frontal chamber can be opened for replacing or fixing the wick if the latter should become soiled.

In order to control evaporation at the body provided therefor, the invention furthermore suggests a closed hollow cylinder of non-gas-permeable material to be provided which surrounds the body and its mounting, and which is slidable along at least part of the probe so that the evaporator body extends to a smaller or larger degree from the cylinder. The front surface of the cylinder has an aperture adjoining the periphery of the evaporator body while its rear surface has a similar aperture which faces or adjoins the inlet conduit.

As a suggested additional feature, the hollow cylinder can be moved lengthwise, from outside, by means of a push button and through the intermediary of a suitable linkage. A slot in the second chamber allows this movement to be performed. This arrangement makes the evaporating efficiency of the inventive device adjustable even to extreme temperatures or other ambient conditions.

Besides having negative temperatures coefficients, the two resistors are preferably chosen so that their resistance - humidity curves at least approximately coincide with their resistance - temperature curves. This provision considerably simplifies the electrical circuit.

It might be added that the first-named curve is understood to relate to the graphical relationship between the resistance value and the relative humidity of the surrounding gas while the second-named curve covers the relationship between the same resistance value and the temperature of the resistor.

Within the normally encountered measuring ranges, the resistance values of the two resistor elements may have to be varied between 1 and 10 kiloohms. It is now worthy to mention that the temperature rise of the first resistor within the evaporator body amounts to about 0.5 to 1, specifically 0.6° to 0.8°C., as a result of the current passing therethrough, and despite the cooling caused by evaporation.

The earlier-mentioned absorbent rod in the supply tank consists, in a preferred exemplary embodiment, of a non-corroding steel tube which is covered with an absorbent material, for example a textile and the like. This results in a precisely defined liquid transport, particularly in the earlier-explained transport impediment.

If the inventive device is to be left out of use for a prolonged period of time, a protective cap can be applied to the portion of the probe which lodges the two chambers, thereby preventing untoward evaporation of the liquid.

The filter material of the first chamber or of its envelope can be high-grade steel with a permeability cross-section of only a few micrometers.

The scale of the indicator or meter can be made replaceable from outside, allowing adaptation to the prevailing measuring conditions.

In the inventive measuring device, the evaporating liquid preferably consists of a water - alcohol mixture. This of course is not considered to be part of the device itself.

When using the probe in a heavily agitated ambient air, measuring errors will result. The reason herefore can be found in radiation and diffusion from the evaporator body to the chamber walls at which a temperature prevails that is below ambient temperature, when the outside air is at rest. If now heat removal is increased by air movement, a density drop simultaneously occurs within the chamber, that is, liquid molecules diffuse into the inner space of the chamber up to pressure equalization, which is synonymous with an increase in evaporation. The reading would consequently simulate a lower air or gas humidity.

In order to compensate for such errors the invention provides that the second resistor also be subjected to a noticeable current the strength of which should be comparable to that of the current passing through the first resistor. The resulting warming up of the second resistor reduces its resistance value while the specific heat of the resistor is transferred to the outer wall of the rear chamber.

An overtemperature, as compared to the ambient, results on the chamber wall, of the same order of magnitude as the undertemperature of the frontal chamber. If now better heat removal is obtained on the two outer chamber walls, e.g., by air movement, the resistance value of the first resistor is increased by the increase in evaporation, on the one hand, and to the same extent the value of the second resistor is similarly increased as a result of cooling, on the other hand. This compensates for the psychrometric difference.

The two resistors can be electrically compared with each other in a bridge circuit. In accordance with the invention, the two resistors, having negative temperature coefficients, are connected in an opposing relationship or in a negative feed-back circuit, as it were, between the respective inverting inputs and outputs of two operational amplifiers. The outputs of the amplifiers are in turn led to two inputs of a third amplifier, one being inverting and the other non-inverting, this amplifier operating in the subtracting mode, the indicator or measuring instrument being connected to the output of the last-named or third amplifier. This circuit arrangement insures that a constant current flows through the temperature-sensitive resistors regardless of their actual resistance values.

In an advantageous manner, the invention further provides in its electrical circuit provisions for measuring ambient temperature between individual humidity measurements, which is necessary for establishing absolute air or gas humidity.

To this end one of the inputs of the third or comparitive amplifier can be selectively connected with the earlier described output of the first operational amplifier, and with a constant voltage source, the latter being preferably constituted by a center tap of a voltage divider connected across the voltage source.

It will be clear to those skilled in the art that switching over to temperature measurements is simply accomplished by pushing an appropriate switch-over button whereupon the instrument directly indicates ambient temperature.

It can be summarized that an entirely novel and unorthodox psychrometer is provided having extremely low space requirement and widely flexible applicability, far superior to known devices of this kind also in respect of measuring accuracy. Contamination of the "wet" resistor is not a critical point anymore because no dirty outer air is being introduced. Only minimum measuring errors are encountered, even with widely differing and varying ambient-air movements, such as in conduits or in wind tunnels.

The inventive device allows humidity of gases, including air, to be measured not only in free spaces but also inside packages, in granular or bulk materials, on surfaces, as well as on hydroscopic bodies. With the latter, water content can easily be determined.

While being portable, the inventive device also lends itself to stationary application, for example for controlling and regulating purposes. The device is operational also under extreme outside temperatures because the liquid transport to the evaporator body ensures a liquid temperature thereat which is adapted to the outside temperature. It should be noted that parts of the probe are so dimensioned and designed that evaporating-liquid supply can be maintained at least for short periods of time even under extreme operating conditions.

Other objects and many of the attendant advantages of the invention will become more easily understood by reference to the subsequent description, when considered in conjunction with the accompanying drawings, wherein.

Figure 1:
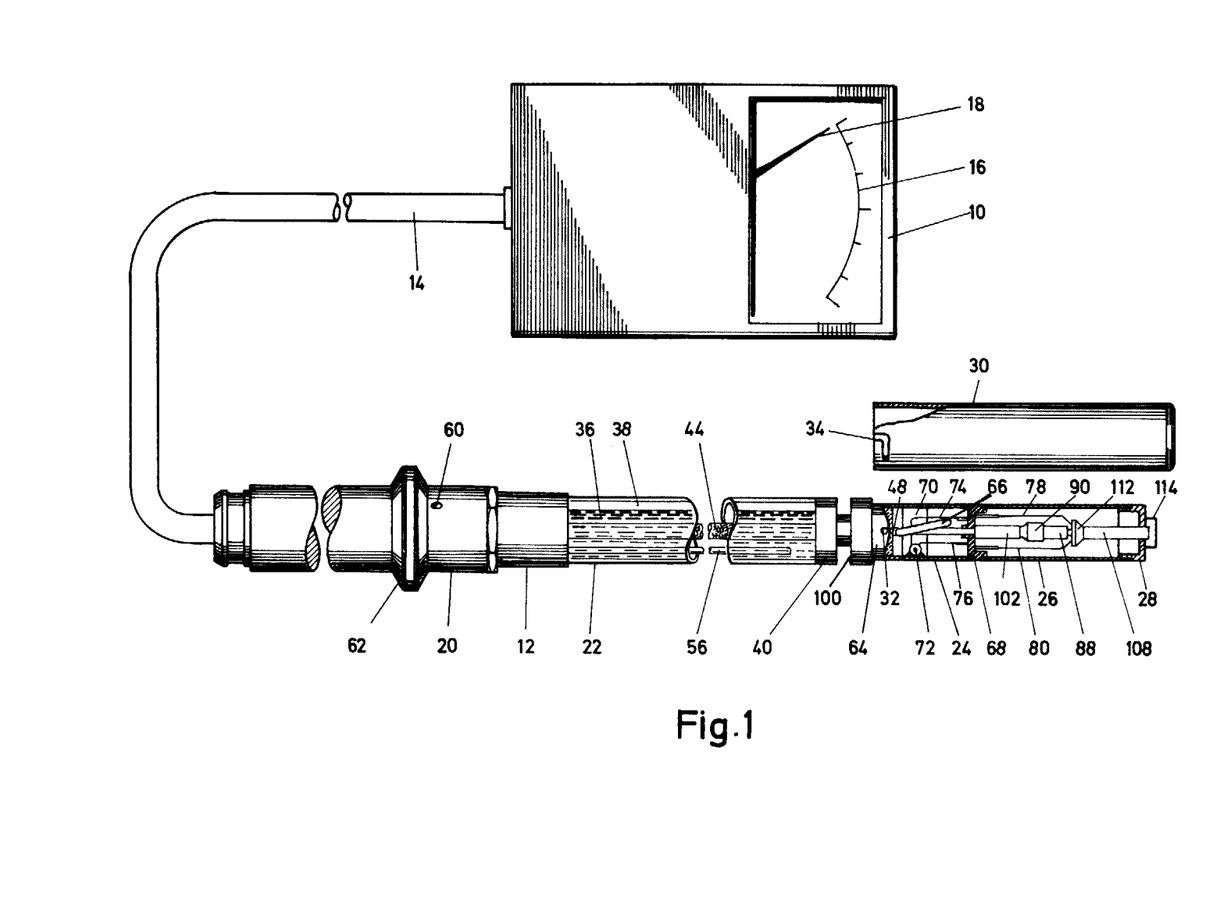
FIG. 1 is a partly sectional view, partly broken away, of the overall measuring arrangement constituting the inventive device for measuring the humidity of gases, at a somewhat reduced scale.

The device shown in FIG. 1 in its entirety has two main parts, namely a portable casing 10 and a probe 12, interconnected by way of an electric cable 14. The casing 10 lodges an electrical differentiating circuit (see FIG. 7) and an indicator or meter 1, which parts will be fully described hereunder. Through an appropriate window, a scale 16 and a pointer 18 for the instrument I can be seen. The cable 14 may have any desired length so that the probe can be applied, independently from the casing 10, at any position and distance therefrom. The elongated form of the probe 12 is not only practical and space-saving but also allows humidity measurements of gases to be taken in narrow passages and holes, as well as inside finely granulated material.

The probe 12 essentially consists of a handle 20, a supply tank 22 for an evaporating liquid 36, a rear or second chamber 24 of a gas-permeable material, and a forwardly or first chamber 26 of a gas-permeable filter material, closeable by means of a cap 28.

Chambers 24, 26 can be covered by a protective cap 30 which can be held in this position by means of a button 32 and a slot 34, constituting a so-called bayonet closure. For longer operational rest periods, cap 30 may be applied to avoid losses in the evaporating liquid 36. Before the first measurement the cap should however be removed in order to achieve an equilibrium for the liquid flow to an evaporator body to be described somewhat later. Otherwise the measurement may be initially falsified. Handle 20 is hollow (not shown in full detail) and lodges the electrical conduits of the probe 12, attached to cable 14.

Figure 2:
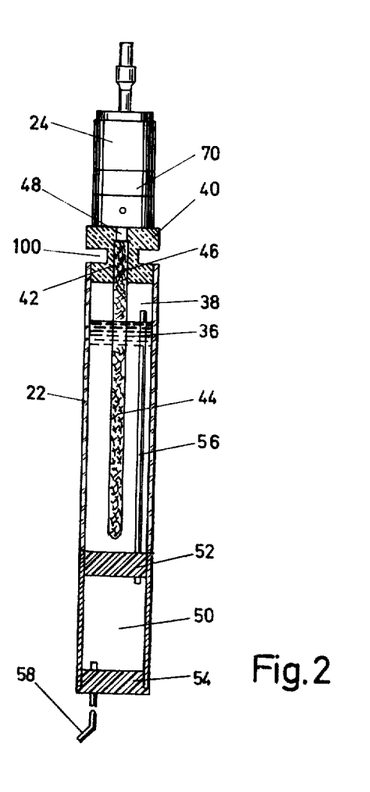
FIGS. 2 through 4 are sectional views of a supply tank forming part of a probe of the device in three different positions to illustrate the behavior of an evaporating liquid within the tank.
Figure 3:
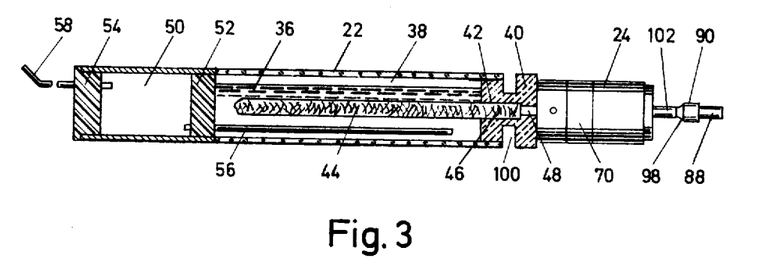
Figure 4:
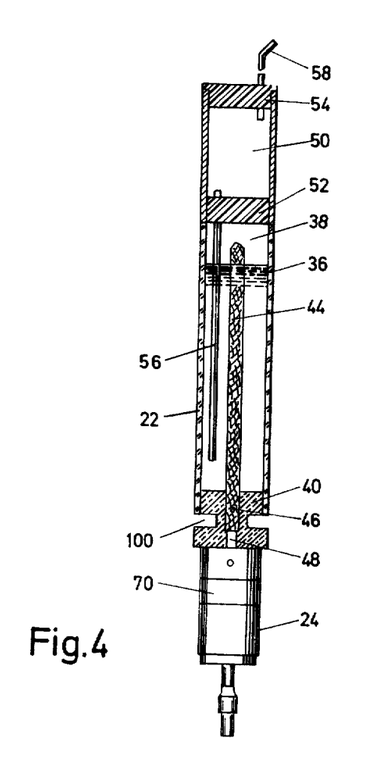

Structural details of tank 22 are shown in FIGS. 2 through 4. It should be noted that FIGS. 2 and 4 represent vertical positions of the probe, during use, while FIG. 3 shows tank 22 in a horizontal position; in FIG. 2 the forward tip of the probe is upwards and in FIG. 4 downwards, as viewed in the drawing. It can be seen that liquid 36 does not completely fill the inside of supply tank 22, a small space 38 being formed above the respective liquid levels.

The front end of tank 22 is closed by a stopper 40 hugging the inner wall of tank 22 in an air-tight manner. Stopper 40 has a central above bore 42 in which an absorbent rod 44 is secured which extends towards the rear of the probe, almost through the entire length of tank 22. The portion of rod 44 reaching into bore 42 constitutes an impediment or transport stop 46 for the liquid supply 36 in the forward direction.

In the position of FIG. 2 it is only the capillarity of absorbent rod 44 which regulates liquid supply because the hydrostatic pressure of liquid 36 is directed backwards. This is however different in FIG. 3 where the hydrostatic pressure of the liquid acts upon stopper 40. Even higher is the pressure in the position according to FIG. 4 because in this case the hydrostatic pressure is increased by the weight of evaporating liquid 36, these pressures being forwardly directed. In this case impediment 46 is particularly effective in regards to the forward transportation or supply of the liquid.

Absorbent rod 44 preferably consists of a non-corroding or stainless steel tube which is covered with an absorbent material, such as textile and the like. This results in narrowly defined supply conditions at the start of impediment 46. The forward end of rod 44 abuts within bore 42 upon the rear, open end of a cannula 48 which further transports liquid 36 in its interior by known capillary action. It might be added at this point that terms like "forward," "rear," etc. in this description relate to the normal use and/or the presented illustration of the inventive device and the probe thereon.

Supply tank 22 is closed by a quick-acting closure (not shown) tightened against subatmospheric pressure. This can consist, for example, of respective openings or aperatures in the envelope of the tank and in a rotatable forward part of the handle, which can be brought into partial or complete alignment. This allows supply tank 22 to be easily refilled.

A collecting receptacle 50 is attached to the rear end of tank 22, a stopper 52 being disposed between the latter and the receptacle 50 while the rear end of the latter is closed by a stopper 54. A pressure-compensating capillary 56 passes through stopper 52, consequently ending in receptacle 50 and near the forward end of tank 22, respectively. A thin aerating tube 58 is passed through rear stopper 54, which similarly ends inside receptacle 50 while its other end passes through handle 20 and leads to an aperture on its outside at a point 60 where possibly exiting liquid does not cause any disturbance. Collecting receptacle 50 is normally empty but it is possible that sometimes some of liquid 36 passes through capillary 56 into receptacle 50; the same can then be discharged through tube 58, for example before a widened abutment ring 62 of handle 20. It might be added that receptacle 50 is not visible in FIG. 1 because it is in the inside of the forward end of handle 20.

In the position of probe 12 shown in FIG. 4 subatmospheric pressure is produced in space 38 when the liquid is forwardly supplied, that is in a downward direction in FIG. 4, because receptacle 50 is tightened against subatmospheric pressure in its arrangement at the open end of supply tank 22. This vacuum contributes, together with impediment 46, to the fact that liquid transport in this position cannot become too large. The pressure in the lower region of tank 22 will continually diminish because it is compensated for the subatmospheric pressure that builds up as space 38 increases.

As soon as the vacuum is higher in space 38 than the pressure in the lower region of tank 22, no further liquid could enter through impediment 46. At this point pressure-compensating capillary 56 becomes effective because air is being introduced through said capillary into the lower tank end as soon as atmospheric pressure in receptacle 50 exceeds the pressure of the liquid at that lower end, whereby the vacuum in space 38 is reduced. This arrangment makes for uniform liquid transport into cannula 48 through impediment 46.

Cannula 48 which starts in bore 42 of stopper 40 passes forwardly through a base 64 on which rear chamber 24 is secured. Within this chamber cannula 48 forms a cooling coil 66 which serves to adapt the temperature of the liquid supplied through the cannula to the ambient termperature prevailing in chamber 24. The forward end of cannula 48 passes through a partition 68 made from a non-conductive material, for example tetrafluoroethylene, to which chambers 24, 26 are secured. The latter chamber 26 is only pushed onto partition 68, and can be removed at all times therefrom for purposes of cleaning, replacement of parts, and the like.

The envelope of rear or second chamber 24 is interrupted by a ring 70 make from a conductive metal and passing around the entire periphery. On the inner side of ring 70, a "dry" resistor 72 is attached, to be referred to hereinafter as the second resistor. A "wet" resistor 82 will be described hereinafter, to be termed the first resistor. In the exemplary, preferred embodiment of the inventive device these resistors have negative temperature coefficients. Leads 74, 76 of resistor 72 are secured to partition 68, and are electrically connected throughout probe 12 with cable 14.

Figure 5:
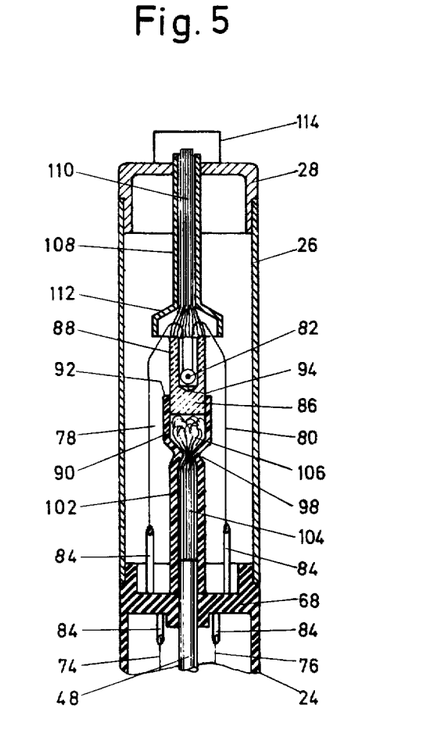
FIG. 5 is a longitudinal sectional view through a first, frontal chamber of the device with some adjoining parts.

Partition 68 also carried leads 78, 80 of first resistor 82, as can be seen in FIG. 5. All connecting leads 74, 76, 78, 80 may be held by partition 68 through the intermediary of rigid, conductive supports 84. Partition 68 acts as a temperature compensator between wires 78, 80 in the cooler chamber 26 and lead 74, 76 in the warmer chamber 24.

As shown in FIG. 5, first resistor 82 is provided at a small distance from the inner bottom surface, somewhat reinforced, identified by numeral 86 in the earlier-mentioned evaporator body 88 which has preferably a beaker shape and is made of ceramic material. By its leads 78, 80, resistor 82 is held free from contact with body 88. The connecting leads themselves are also free from contact with solid parts of probe 12, with the exception of supports 84.

Thickened bottom 86 of body 88 is held in a liquid-type manner by a tubular mounting 90 preferably made of tetrafluoroethylene. There is consequently a longitudinal distance between probe 12 at a front edge 92 of mounting 90 and inner bottom surface 94 of evaporator body 88. This arrangement constitutes a pre-evaporating path between edge 92 and surface 94.

Mounting 90 has a strong restriction 98 at a certain distance behind outer bottom surface 96 of body 88, constituting a heat localization spot for the relatively low heat conduction in mounting 90, in both directions, as a result of the considerable cross-sectional reduction. A similar heat localization spot can be provided in stopper 40, namely in the form of an annular restriction 100.

Mounting 90 behind restriction 98 is continued, preferably as a sole piece, in the form of an inlet conduit 102 which extends through to partition 68. Cannula 48 terminates in the rear end of conduit 102 and meets the rear end of a wick 104 which preferably fills up conduit 102. Wick 104 widens within a space 106, between restriction 98 and outer bottom surface 96, and it rests loosely on said surface 96. This constitutes a liquid reservoir within space 106, which insures satisfactory liquid supply, together with the liquid stored in thickened bottom 86, even in case of increases in evaporation of a short duration.

Cap 28 which closes forward chamber 26 has substantially in its center a longitudinal, tubular support 108 which is filled up with an absorber wick 110. On its rear, support has a bell-shaped enlargement 112 which extends about the forward edge of evaporator body 88. Within this enlargement 112, wick 110 is also enlarged or widened, and it loosely contacts the forward edge of body 88. This eliminates an untoward liquid film from the surface of body 88, and also possible impurities therefrom. In the case of a strong contamination wick 110 can be replaced in that a cover 114 can be removed from the front end of cap 28.

Figure 6:
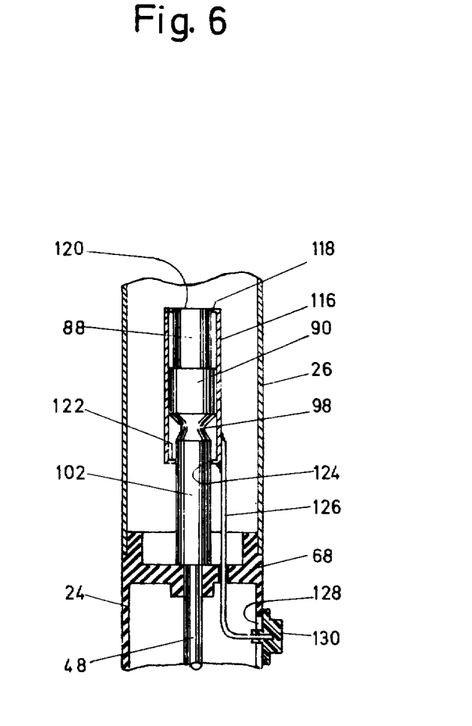
FIG. 6 is a view similar to that of FIG. 5 but of an alternative embodiment which however can be combined with that of FIG. 5.

In FIG. 6 only those parts of chambers 26, 24 are shown which are in close proximity to partition 68. A preferred additional mechanism is shown herein which is compatible with and can be combined with the structures of the other views. For the sake of clarity, support 108, 112 with wick 110 as well as all connecting leads of the resistors and their supports have been omitted from FIG. 6. The modification relates to a hollow cylinder 116 made of a non-gas-permeable material, which surrounds evaporator body 88, mounting 90 and a portion of inlet conduit 102, and which is slideable in the longitudinal direction of probe 12 so that body 88 protrudes more or less, as the case may be, from cylinder 116. The front surface 118 of the latter has an aperture 120 therein, adjoining the outer surface of body 88, while its rear surface 122 has another aperture 124, adjoining conduit 102.

A linkage 126 is rigidly secured to hollow cylinder 116, then guided through a longitudinal slot 128 of chamber 24 to the outside, and which linkage ends in a slideable button 130. The length of slot 128 approximately corresponds to the free end of body 88 outside of mounting 90. By sliding button 130 it is consequently possible to move cylinder 116, from the position occupied in FIG. 6 in which it practically surrounds the entire body 88, to a rearwardly position where evaporator body 88 almost completely protrudes from cylinder 116.

When cylinder 116 is in the position of FIG. 6, the gas which surrounds evaporator body 88 is soon saturated with humidity, and no further evaporation takes place. If, on the other hand, cylinder 116 is pushed rearward, evaporation increases. This allows to regulate the speed of evaporation, which makes for a considerable adaptability of the inventive device to all possible working conditions.

Figure 7:
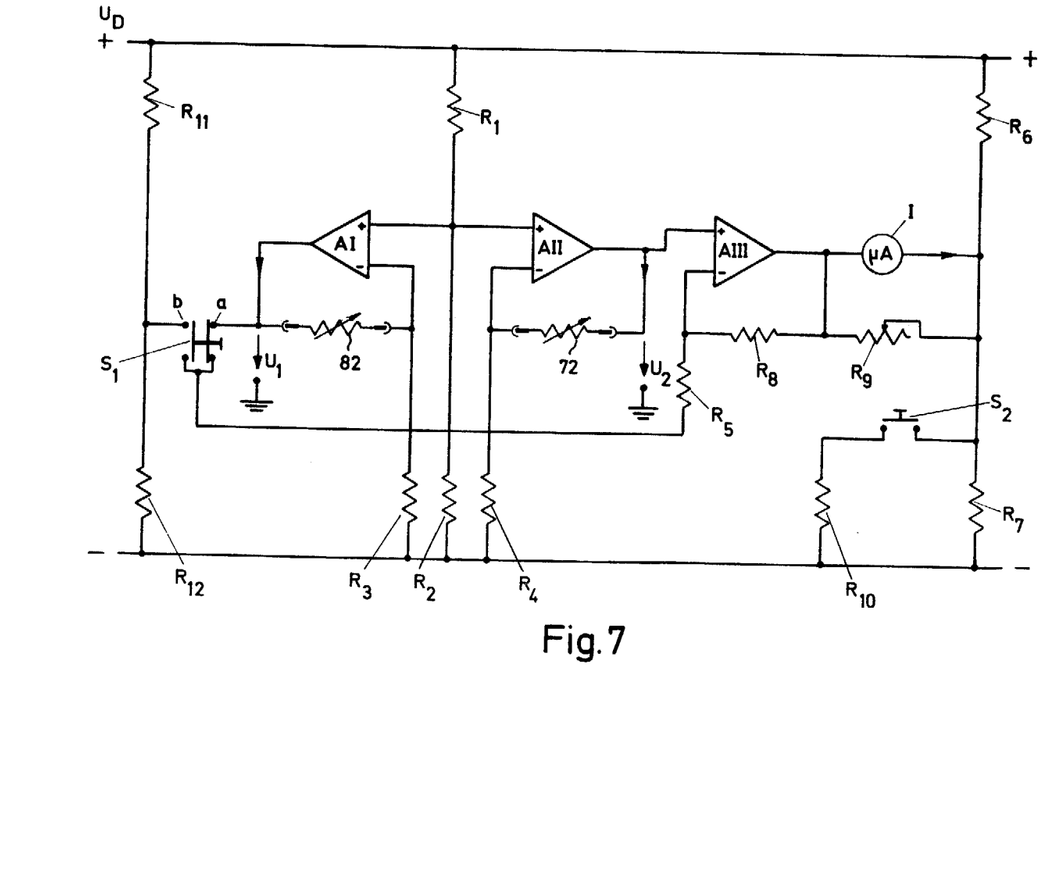
FIG. 7 is a schematical electric circuit diagram of the inventive device.

The device according to the invention, constituting an electrical psychrometer, is schematically shown in the electric circuit diagram of FIG. 7 which contains some conventional elements designated by their conventional symbols.

It is the object of the circuit to provide a clear indication or reading of the resistance differences of resistors 82, 72 which result from the different temperatures, concomitant with the measured humidity values.

The first, "wet" resistor 82 is connected as a negative feed-back, as it were, that is between an inverting input and an output of a first operational amplifier AI, as shown. The second, "dry" resistor 72 is similarly connected between an inverting input and an output of a second amplifier AII. Both resistors are of the type having negative temperature coefficients; additionally, they have preferably resistance - humidity curves that approximate their resistance - temperature curves. The resistance values of resistors 82, 72 are selected from within a preferred range of 1 to 10 kiloohms.

The non-inverting inputs of the two amplifiers are connected to a distributing point of a voltage divider $R_1$, $R_2$, connected between the poles of a voltage source $U_0$. The inverting inputs of the two amplifiers are connected with the negative pole of the voltage source by the intermediary of respective biasing resistors $R_3$, $R_4$.

Amplifiers AI, AII have respective output voltages $U_1$, $U_2$ which are solely dependent on the prevailing values of resistors 82, 72, connected in the respective negative feed-back circuits. It is the effect of the applied negative temperature coefficients of these resistors that the output voltages $U_1$, $U_2$ decrease with increasing temperature.

The output of first amplifier AI is connected to an inverting input of a third operational amplifier AIII by the intermediary of a switch $S_1$ and a biasing resistor $R_5$. In a similar manner, the output of the second amplifier AII is connected with the non-inverting input of the third amplifier, which consequently works as a differential amplifer, namely in the subtracting mode, so that its output supplied a difference of voltages $U_1$, $U_2$.

The output current of the amplifier AIII, corresponding to the voltage difference, is fed to indicator or measuring instrument I (see also FIG. 1), connected between the output of the third amplifier and a divider center between resistors $R_6$, $R_7$. A resistor $R_8$ provides negative feed-back for the third amplifier. Adjustable resistor or potentiometer $R_9$, connected parallel to indicator I, serves for a one-time zero adjustment or compensation when the inventive device is assembled.

A further resistor $R_{10}$ can be connected in parallel to resistor $R_7$, by the use of a switch $S_2$, making for a change in the measuring range of indicator I.

The circuit of FIG. 7 is designed so that it can simultaneously serve for temperature measurements. In this case amplifier AI has to be disconnected together with resistor 82, serving for the "wet" measurement. To this end, switch $S_1$ is brought from its position $a$ into position $b$, as a result of which the inverting input or amplifier AIII is connected, by way of resistor $R_5$, only with a divider point between resistors $R_{11}$, $R_{12}$. As a result, the indicator I is fed with a current which is proportional to the voltage difference prevailing between the divider center and the temperature-dependent output of the second amplifier AII.

It should be understood by those skilled in the art that the above description relates only to preferred embodiments of the invention device for measuring the humidity of gases, and that several departures and modifications can be adopted to the described exemplary embodiments, without departing from the spirit and scope of the present invention.

What I claim is:

1. A device for measuring the humidity of gases, comprising, in combination: probe means including two closed chambers, at least the first or "wet" chamber being made at least in part of a gas-permeable filter material with a pore size allowing water molecules in the air to pass freely, thus constituting means for equalizing air humidity in said first chamber with that of the outside, and for preventing outer air streams to reach said first chamber, the second chamber being a "dry" chamber; a supply tank for an evaporating liquid, a porous evaporator body in said first chamber, two temperature-sensitive electric resistors, respectively disposed in said chambers, and means for substantially uniformly supplying said liquid to said evaporator body which latter surrounds a first one of said resistors; a voltage source and an electrical circuit for passing a noticeable current through at least said first resistor so as to increase its temperature, said circuit including electric differentiating means for comparing the resistance values of said resistors; indicator means connected to the latter for reading therefrom humidity values of a gas in the neighborhood of said probe in proportion to the established resistance values; an absorbent rod in said supply tank extending towards the rear of said probe means; a collecting receptacle at the end of said supply tank opposite to that having said chambers thereat; a pressure-compensating capillary connecting said supply tank with said receptacle; and an aerating tube leading from said receptacle to the outside, at a point where possibly exiting liquid does not cause any disturbance.

2. The measuring device as defined in claim 1, wherein said evaporator body is of a ceramic material.

3. The measuring device as defined in claim 1, further comprising a quick-acting closure and means for said supply tank for quick filling of the same and for producing a subatmospheric pressure therein.

4. The measuring device as defined in claim 1, further comprising a protective cap for at least one of said chambers.

5. The measuring device as defined in claim 1, wherein said electrical circuit includes means for passing a noticeable current of about the same strength through both of said resistors.

6. The measuring device as defined in claim 1, further comprising substantially rigid leads for at least one of said resistors for supporting the same free from contact with solid parts of said probe means.

7. The measuring device as defined in claim 6, wherein said chambers have a common partition, both of said resistors having substantially rigid leads which are secured to said partition.

8. The measuring device as defined in claim 1, wherein said first chamber has an envelope of a high-grade steel filter material with a permeability cross-section of a few micrometers.

9. The measuring device as defined in claim 8, wherein said indicator means has a scale with means for externally replacing the same.

10. A device for measuring the humidity of gases, comprising, in combination: probe means including two closed chambers, at least a first one of said chambers being made at least in part of a gas-permeable filter material, a supply tank for an evaporating liquid, a porous evaporator body in said first chamber, two temperature-sensitive electric resistors, respectively disposed in said chambers, and means for substantially uniformly supplying said liquid to said evaporator body which latter surrounds a first one of said resistors; a voltage source and an electrical circuit for passing a noticeable current through at least said first resistor so as to increase its temperature, said circuit including electric differentiating means for comparing the resistance values of said resistors; and indicator means connected to the latter for reading therefrom humidity values of a gas in the neighborhood of said probe in proportion to the established resistance values; wherein said supply tank and a second one of said chambers has a restriction therebetween which constitutes a heat localization spot.

11. The measuring device as defined in claim 10, wherein said resistors have negative temperature coefficients, and they have resistance - humidity curves approximating their resistance - temperature curves.

12. The measuring device as defined in claim 10, wherein said resistors have negative temperature coefficients, and they have resistance values selected within the range of 1 to 10 kiloohms.

13. A device for measuring the humidity of gases, comprising, in combination: probe means including two closed chambers, at least a first one of said chambers being made at least in part of a gas-permeable filter material, a supply tank for an evaporating liquid, a porous evaporator body in said first chamber, two temperature-sensitive electric resistors, respectively disposed in said chambers, and means for substantially uniformly supplying said liquid to said evaporator body which latter surrounds a first one of said resistors; a voltage source and an electrical circuit for passing a noticeable current through at least said first resistor so as to increase its temperature, said circuit including electric differentiating means for comparing the resistance values of said resistors; indicator means connected to the latter for reading therefrom humidity values of a gas in the neighborhood of said probe in proportion to the established resistance values; a cap on the front end of said first chamber; an inner support carried thereby; and an absorber wick insertable in the latter; wherein said support reaches near said evaporator body, and one of said wick rests on the open end of said evaporator body.

14. The measuring device as defined in claim 13, wherein said support has a bell-shaped enlargement near said open end of the evaporator body.

15. The measuring device as defined in claim 13, further comprising means on said cap for opening the same for replacement of said wick.

16. A device for measuring the humidity of gases, comprising, in combination: probe means including two closed chambers, at least a first one of said chambers being made at least in part of a gas-permeable filter material, a supply tank for an evaporating liquid, a porous evaporator body in said first chamber, two temperature-sensitive electric resistors, respectively disposed in said chambers, and means for substantially uniformly supplying said liquid to said evaporator body which latter surrounds a first one of said resistors; a voltage source and an electrical circuit for passing a noticeable current through at least said first resistor so as to increase its temperature, said circuit including electric differentiating means for comparing the resistance values of said resistors; and indicator means connected, to the latter for reading therefrom humidity values of a gas in the neighborhood of said probe in proportion to the established resistance values; wherein said resistors have negative temperature coefficients; said differentiating means includes first, second and third amplifier circuits, each having two inputs, one of them being of the inverting type; said resistors being connected in respective negative feed-back circuits between said inverting inputs and the outputs of said first and said second amplifier circuits, with said outputs being fed to said inputs of the third amplifier circuit, the latter being connected to operate in the subtracting mode; said indicator means is connected to the output of said third amplifier circuit; said electrical circuit further including a constant-voltage source and switch-over means for selectively linking one of said inputs of said third amplifier circuit with said output of one of said first and said second circuits and with said constant-voltage source, the latter connection for testing and calibrating purposes.

17. A device for measuring the humidity of gases, comprising, in combination: probe means including two closed chambers, at least a first one of said chambers being made at least in part of a gas-permeable filter material, a supply tank for an evaporating liquid, a porous evaporator body in said first chamber, two temperature-sensitive electric resistors, respectively disposed in said chambers, and means for substantially uniformly supplying said liquid to said evaporator body which latter surrounds a first one of said resistors; a voltage source and an electrical circuit for passing a noticeable current through at least said first resistor so as to increase its temperature, said circuit including electric differentiating means for comparing the resistance values of said resistors; and indicator means connected to the latter for reading therefrom humidity values of a gas in the neighborhood of said probe in proportion to the established resistance values; wherein said probe means includes a tubular member lodging said chambers in lengthwise alignment; and a handle for ease of manipulation; said first chamber with said evaporator body being attached to the front end of said probe means; said evaporator body having a beaker-formed enlargement; and wherein said first resistor is held near the inner bottom of said evaporator body.

18. The measuring device as defined in claim 17, further comprising a portable casing which lodges the essential elements of said electrical circuit and said indicator means, and cable means connecting said casing with said probe means, said indicator means including a scale with a pointer visible from outside.

19. The measuring device as defined in claim 17, further comprising a thin-walled, tubular mounting within said first chamber, made of a poor heat conductor, said evaporator body having a bottom which is thicker than its walls and is held in a liquid-tight manner in said mounting, the latter extending beyond the outer bottom of said body, narrowing in the opposite direction to a portion constituting a heat localization spot, said portion being continued in the form of an inlet conduit which carries therein a wick in contact with said outer bottom for feeding the evaporating liquid thereto.

20. The measuring device as defined in claim 19, wherein said mounting defines an inner space into which said wick extends with a substantial part thereof so as to fill said space with the evaporating liquid.

21. The measuring device as defined in claim 19, wherein said mounting is of tetrafluoroethylene.

22. The measuring device as defined in claim 19, further comprising a closed hollow cylinder of non-gas-permeable material, surrounding said evaporating body and said mounting, and means for sliding said cylinder along at least one part of said probe means, said body protruding from said cylinder to an adjustable extent, said cylinder having apertures at both ends, one adjoining the outer surface of said body and the other adjoining said inlet conduit of the body.

23. The measuring device as defined in claim 22, further comprising a linkage within said first chamber for rigidly supporting said cylinder, said linkage leading outwardly in the region of said second chamber, the latter having an elongated slot through which a button end of said linkage protrudes for displacing said second chamber by at least the length of the free end of said evaporator body.

24. The measuring device as defined in claim 19, further comprising a cannula between said second chamber and said supply tank and a cooling coil in said first chamber connected with said cannula, one end of said wick being in operative contact with said cannula for purposes of adapting the temperature of the evaporating liquid flowing therethrough to the ambient temperature.

25. The measuring device as defined in claim 24, further comprising an absorbent rod within said supply tank, respective ends of said rod and of said cannula being in operative contact with each other.

26. The measuring device as defined in claim 25, wherein said absorbent rod is in the form of a non-corroding steel tube covered with an absorbent material.

27. The measuring device as defined in claim 25, wherein said supply tank is in the form of an elongated, substantially transparent tube, said absorbent rod extends substantially along the entire length of said tank, and said end of the rod protrudes from said cannula, thereby constituting there an impediment for the evaporating liquid.

28. The measuring device as defined in claim 27, further comprising a collecting receptacle at the end of said supply tank opposite to the end having said chambers thereat, a pressure-compensating capillary connecting said supply tank with said receptacle, and an aerating tube leading from said receptacle to the outside, namely at a point where possibly exiting liquid does not cause any disturbance.

* * * * *